United States Patent
Ohtsuka

(10) Patent No.: US 10,589,667 B2
(45) Date of Patent: Mar. 17, 2020

(54) VEHICLE CEILING LAMP WITH LIGHT SOURCE SUBSTRATE COVER

(71) Applicant: Yazaki Corporation, Tokyo (JP)

(72) Inventor: Haruhito Ohtsuka, Shizuoka (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 86 days.

(21) Appl. No.: 15/973,704

(22) Filed: May 8, 2018

(65) Prior Publication Data
US 2018/0334095 A1 Nov. 22, 2018

(30) Foreign Application Priority Data
May 16, 2017 (JP) ................................. 2017-097231

(51) Int. Cl.
| | | |
|---|---|---|
| B60Q 3/54 | (2017.01) | |
| B60Q 3/51 | (2017.01) | |
| B60Q 3/74 | (2017.01) | |
| B60Q 3/82 | (2017.01) | |
| B60Q 3/60 | (2017.01) | |

(52) U.S. Cl.
CPC ............ B60Q 3/51 (2017.02); B60Q 3/60 (2017.02); B60Q 3/74 (2017.02); B60Q 3/82 (2017.02)

(58) Field of Classification Search
CPC . B60Q 3/54; B60Q 3/20; B60Q 3/208; B60Q 3/74; F21W 2106/00; F21W 2107/10; F21S 41/141; F21S 41/162
See application file for complete search history.

(56) References Cited

U.S. PATENT DOCUMENTS

| | | | | |
|---|---|---|---|---|
| 4,443,832 A * | 4/1984 | Kanamori | ................ | B60Q 1/26 362/311.13 |
| 6,595,668 B2 * | 7/2003 | Hatagishi | ................ | B60Q 3/82 362/479 |
| 6,601,976 B1 * | 8/2003 | Rhee | ................ | F21V 15/01 362/374 |
| 6,888,723 B2 * | 5/2005 | Kamiya | ................ | H05K 3/202 361/715 |
| 7,370,995 B2 * | 5/2008 | Hein | ................ | G01D 11/28 362/488 |
| 7,416,317 B2 * | 8/2008 | Okabe | ................ | F21V 3/04 362/488 |

(Continued)

FOREIGN PATENT DOCUMENTS

| | | |
|---|---|---|
| JP | 2-77803 U | 6/1990 |
| JP | 2011116259 A | 6/2011 |

(Continued)

OTHER PUBLICATIONS

Office Action dated Apr. 17, 2019 in by the Japanese Patent Office in application No. 2017-097231.

*Primary Examiner* — Ismael Negron
(74) *Attorney, Agent, or Firm* — Sughrue Mion, PLLC

(57) ABSTRACT

A lamp includes a housing configured to be attached to a ceiling of a vehicle and provided with a light source opening, a light source provided on a substrate to face the light source opening, a lens cover provided below the housing to cover the light source opening a substrate cover provided on the substrate and housing, and an inclined plane part provided in the housing and inclined upward towards the light source opening.

2 Claims, 12 Drawing Sheets

(56) References Cited

U.S. PATENT DOCUMENTS

| | | | |
|---|---|---|---|
| 7,674,027 B2 * | 3/2010 | Yoshihara | F21V 29/00 362/547 |
| 8,419,245 B2 * | 4/2013 | Nagai | B60Q 3/51 362/488 |
| 8,820,989 B2 * | 9/2014 | Suzuki | B60Q 3/51 362/490 |
| 9,512,981 B2 * | 12/2016 | Tsuchiya | F21V 3/02 |
| 10,245,991 B1 * | 4/2019 | Salter | B60Q 3/20 |
| 2010/0188838 A1 * | 7/2010 | Yajima | B60Q 3/74 362/84 |
| 2011/0222306 A1 | 9/2011 | Nagai et al. | |
| 2013/0279189 A1 | 10/2013 | Suzuki et al. | |

FOREIGN PATENT DOCUMENTS

| | | |
|---|---|---|
| JP | 2012144183 A | 8/2012 |
| JP | 5162420 B2 | 3/2013 |

\* cited by examiner

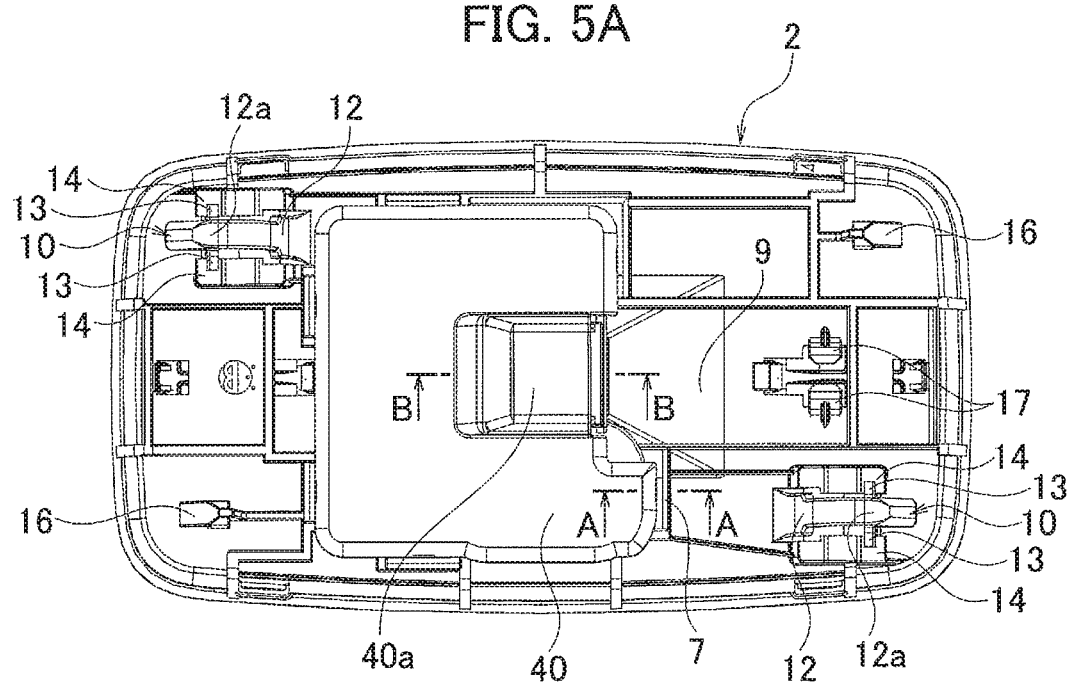

VEHICLE CEILING LAMP WITH LIGHT SOURCE SUBSTRATE COVER

CROSS REFERENCE TO RELATED APPLICATION

The present application is based on, and claims priority from Japanese Patent Application No. 2017-097231, filed May 16, 2017, the disclosure of which is hereby incorporated by reference herein in its entirety.

TECHNICAL FIELD

The present application relates to an indoor illumination lamp to be installed on a ceiling in an interior of a vehicle or the like.

BACKGROUND ART

An indoor illumination lamp disclosed in JP 5162420 B has been proposed as a conventional indoor illumination lamp to be installed on a ceiling in an interior of a vehicle or the like. As illustrated in FIGS. 10 to 12, the conventional indoor illumination lamp 100 includes a housing 101 including a ceiling attachment unit 102 which can be attached to a ceiling in the interior of a vehicle, a lens cover 110 attached below the housing 101, and a function unit 120 mounted on the upper side of the housing 101.

The housing 101 is provided with a light source opening 103, and an attachment wall 104 erected to surround the light source opening 103. The function unit 120 is mounted in the attachment wall 104. At the function unit 120, a light source 121 is provided at a position facing the light source opening 103. Light from the light source 121 travels through the light source opening 103 and is transmitted through the lens cover 110, and the vehicle interior is irradiated with the light.

SUMMARY

The conventional indoor illumination lamp 100, however, has a problem that foreign matter such as dust or dirt, which falls from a ceiling or the like onto the housing 101, gets into the inside of the lens cover 110 through the light source opening 103. When foreign matter gets into the inside of the lens cover 110, this causes uneven irradiation or the like.

An irradiation range E from the light source opening 103 of the conventional indoor illumination lamp 100 is illustrated in FIG. 13. There is also a demand for enlarging the irradiation range E as much as possible. Although it is possible to prevent entering of the foreign matter by providing a rib 105 around the light source opening 103, it is still impossible to enlarge the irradiation range E as illustrated by the virtual lines in FIG. 13.

The present application has been made with the aim of resolving the above problems, and the object thereof is to provide an indoor illumination lamp, which can expand the irradiation range from the light source opening and can also prevent entering of foreign matter from the light source opening as much as possible.

An indoor illumination lamp according to an aspect of the present application includes a housing capable of being attached to a ceiling in an interior of a vehicle and provided with a light source opening, a lens cover provided below the housing so as to cover the light source opening, a substrate provided on the upper side of the housing and provided with a light source at a position facing the light source opening, a substrate cover provided on the upper side of the substrate and the housing so as to cover the substrate, and an inclined plane part provided at the housing and inclined upward toward a position where the light source opening is fainted.

With the indoor illumination lamp according to the aspect of the present application, it is possible to narrow or eliminate a gap between the substrate and a position of the housing where the light source opening is formed, and therefore foreign matter hardly enters from the light source opening. Moreover, the inclined plane part becomes highest at the position of the light source opening and becomes lower with the distance from the light source opening, and therefore the irradiation range from the light source opening in the indoor illumination lamp according to the aspect of the present application is expanded in comparison with a case where a rib is provided around a light source opening as in the conventional indoor illumination lamp. Consequently, it is possible with the indoor illumination lamp according to the aspect of the present application to expand the irradiation range from the light source opening and also to prevent entering of foreign matter from the light source opening as much as possible.

BRIEF DESCRIPTION OF THE DRAWINGS

FIG. 5A is a plan view of a housing, to which a substrate cover is mounted, in the indoor illumination lamp according to the embodiment, and FIG. 5B is a plan view of the housing as a single body of an indoor illumination lamp according to an embodiment.

DESCRIPTION OF EMBODIMENTS

Figure 1:
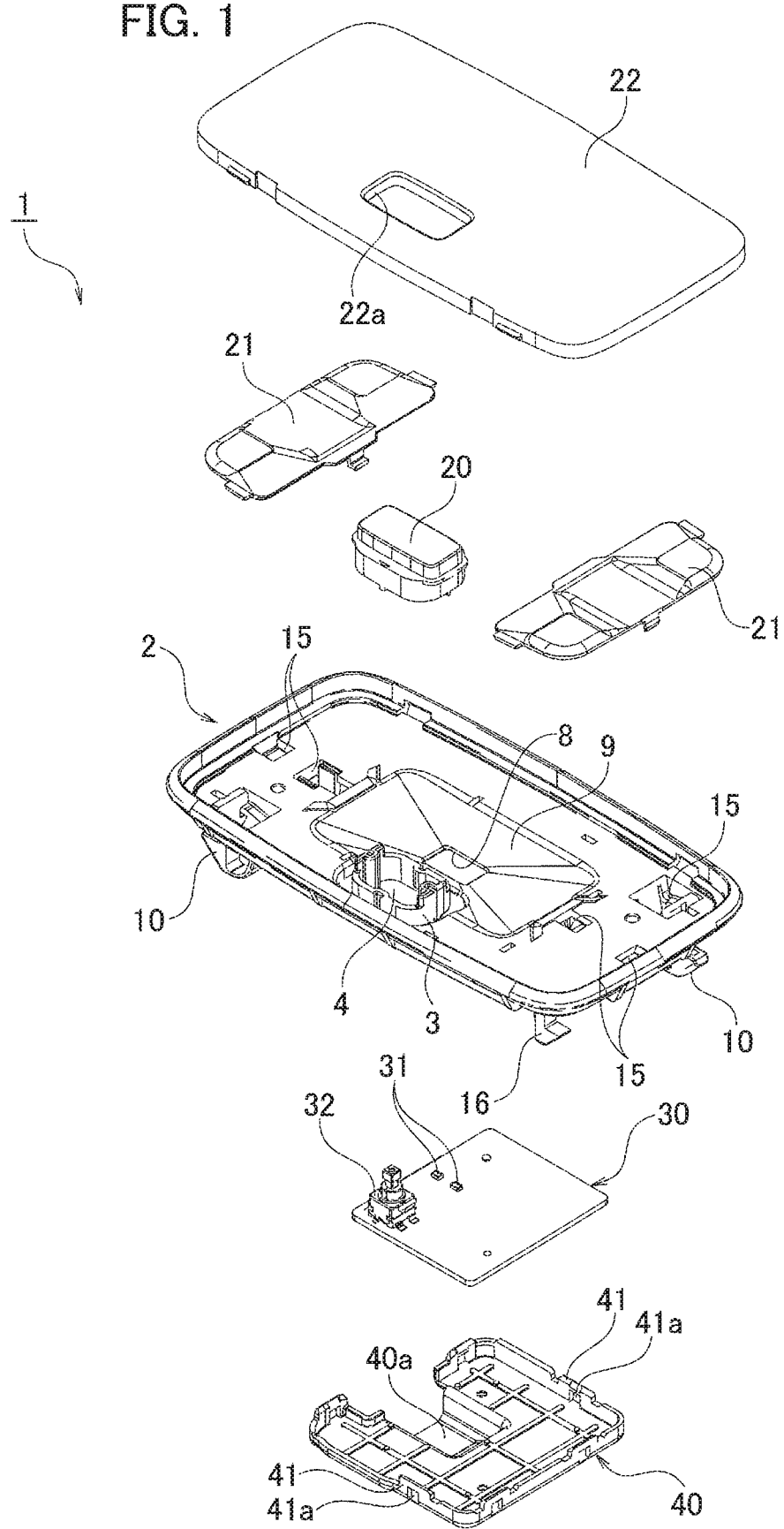
FIG. 1 is an exploded perspective view of an indoor illumination lamp according to an embodiment seen from below (a side of an interior).

The following description will explain an indoor illumination lamp according to an embodiment with reference to the drawings.

As illustrated in FIGS. 1 to 4B, an indoor illumination lamp 1 according to an embodiment is installed on a ceiling in an interior of a vehicle. The indoor illumination lamp 1 includes a housing 2 capable of being attached to a ceiling in the interior of the vehicle, a switch knob 20 to be mounted to the housing 2 from below; two inner covers 21 to be attached below the housing 2, a lens cover 22 to be attached below the housing 2, a substrate 30 provided at an upper position of the housing 2, and a substrate cover 40 to be attached above the housing 2. Directions of below and above mean directions in a state where the indoor illumination lamp 1 is installed on the ceiling.

The housing 2 is formed of a light nontransparent member. As illustrated in detail in FIGS. 1, 2, 5A and 5B, a knob attachment wall 3 is provided on a lower surface side of the housing 2. The switch knob 20 is mounted inside the knob attachment wall 3. A switch function advancing opening 4 is formed inside the knob attachment wall 3. First attachment parts 10 and second attachment parts 16 are provided at four corners on an upper surface side of the housing 2. The first attachment parts 10 and the second attachment parts 16 are provided respectively at two corners on different diagonal lines.

As illustrated in FIGS. 4A to 6B, each of the first attachment parts 10 includes a cantilevered elastic arm part 11 having a base end part supported by the housing 2, a pair of guide leg parts 13 extended downward from a tip part 12 of the elastic arm part 11, and a pair of sliding tables 14 projected on both sides of the elastic arm part 11. Each of the sliding tables 14 includes a first horizontal sliding surface 14a at a low position, an inclined sliding surface 14b, and a second horizontal sliding surface 14c at a high position.

The tip part 12 of the elastic arm part 11 has an upper surface constituted of an inclined plane 12a. A lower end surface 13a of each of the guide leg parts 13 is arranged in proximity to a first horizontal sliding surface 14a of each of the sliding tables 14 in a no-load state. The inclined plane 12a of the elastic arm part 11, the lower end surface 13a of each of the guide leg parts 13, and each of the sliding surfaces 14a, 14b, 14c of each of the sliding tables 14 are subjected to surface property processing, so that a low frictional resistance surface having a low frictional resistance is formed.

Figure 2:
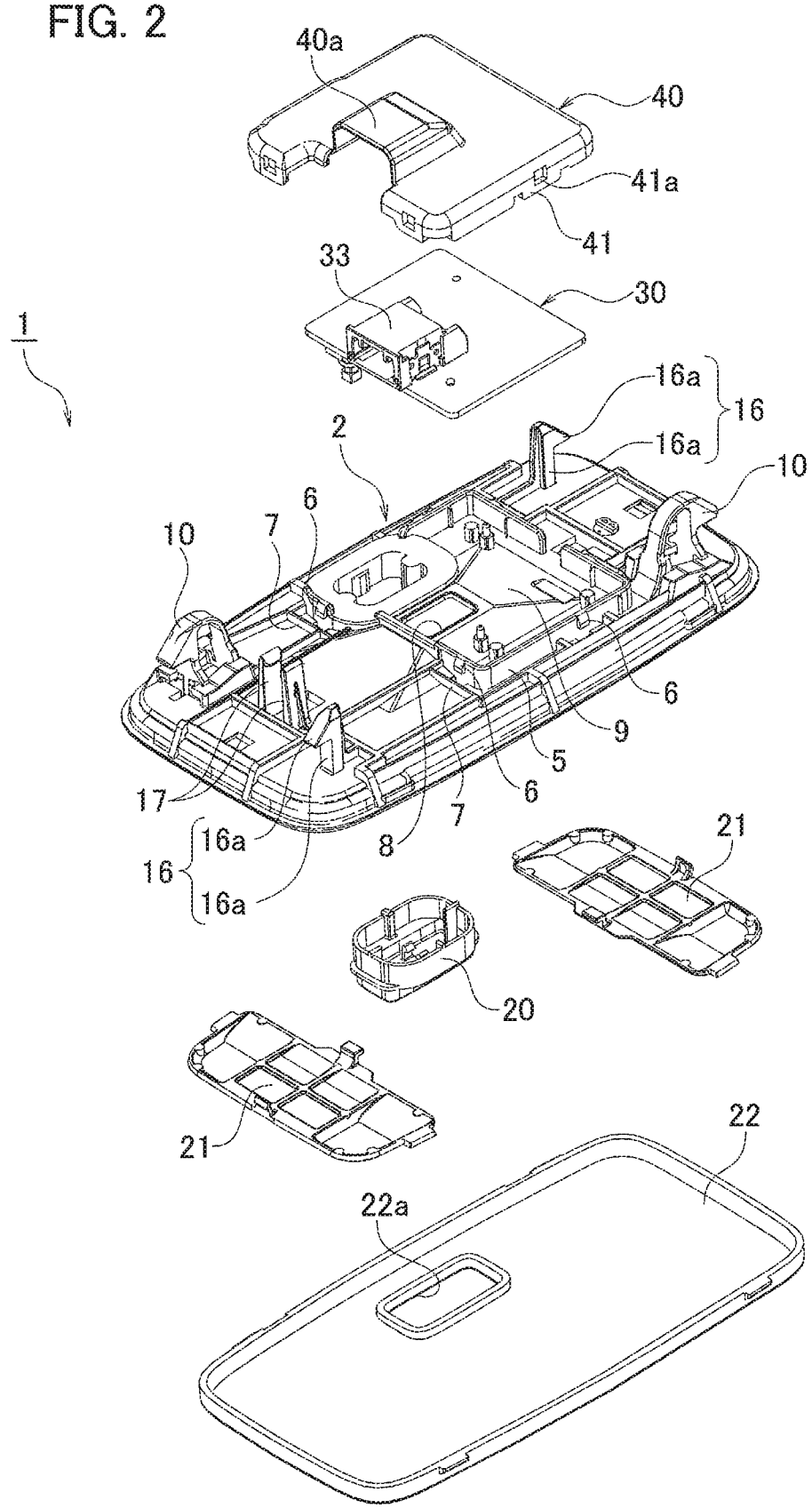
FIG. 2 is an exploded perspective view of the indoor illumination lamp according to the embodiment seen from above (a side of a ceiling).
Figure 3:
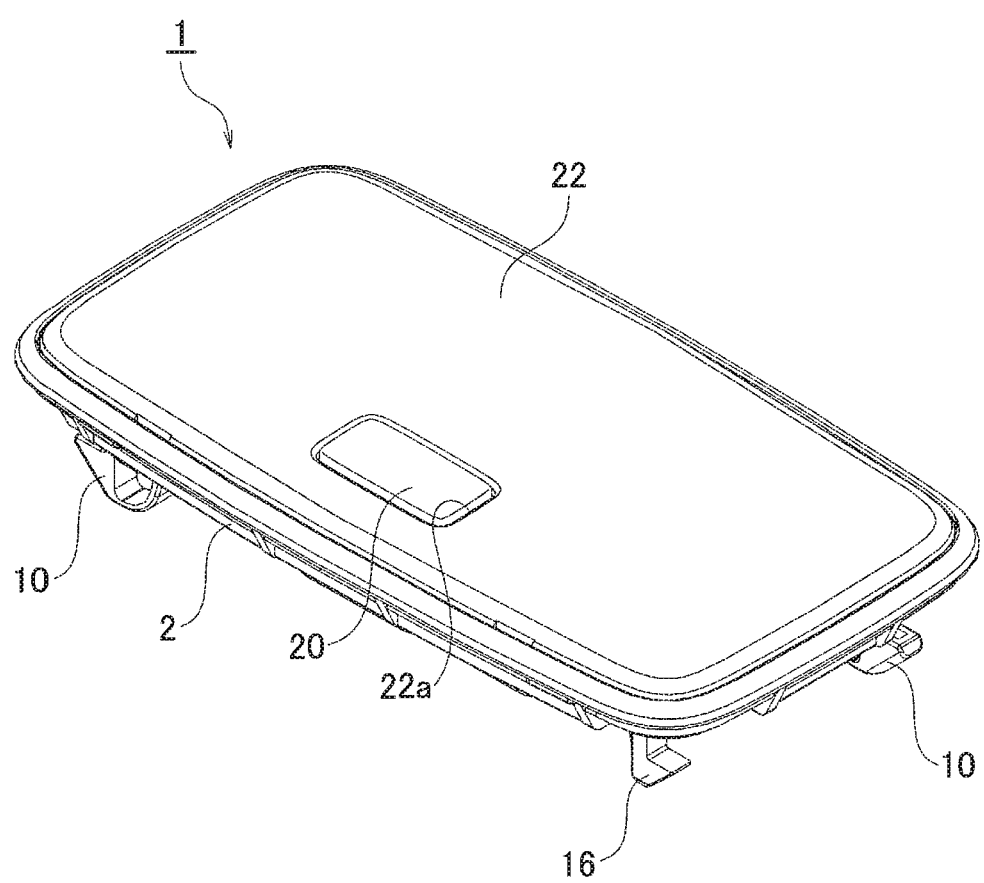
FIG. 3 is a perspective assembly drawing of the indoor illumination lamp according to the embodiment seen from below (the side of the interior).

As illustrated in FIG. 2, each of the second attachment parts 16 includes a vertical elastic arm part 16a and a claw part 16b provided at a tip of the vertical elastic arm part 16a.

A pair of electric wire routing ribs 17 are provided on the upper surface side of the housing 2. The pair of electric wire routing ribs 17 are provided at a center on the side of one short side of the housing 2. The pair of electric wire routing ribs 17 rout an electric wire W on the side of the vehicle body along a predetermined path (see FIG. 4B).

Figure 8A:
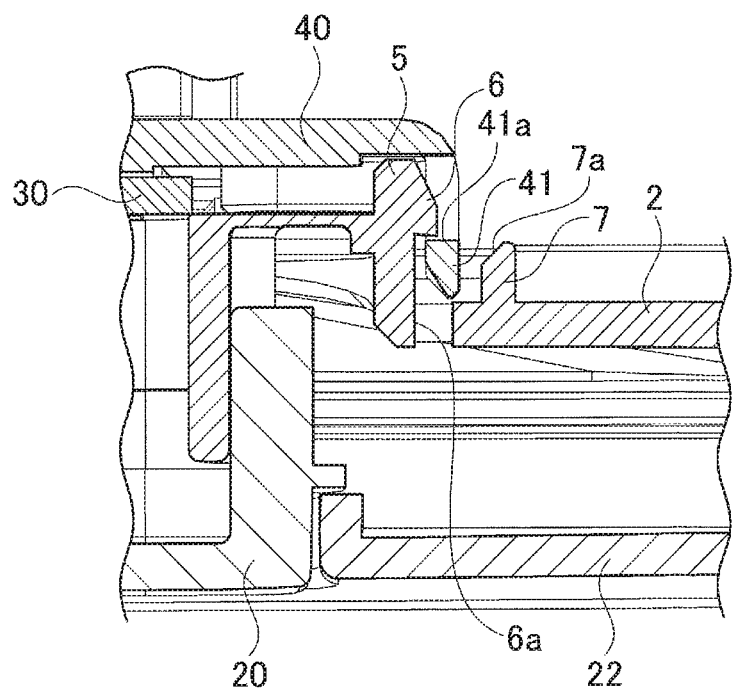
FIG. 8A is a sectional view along line A-A in FIG. 5A.
Figure 8B:
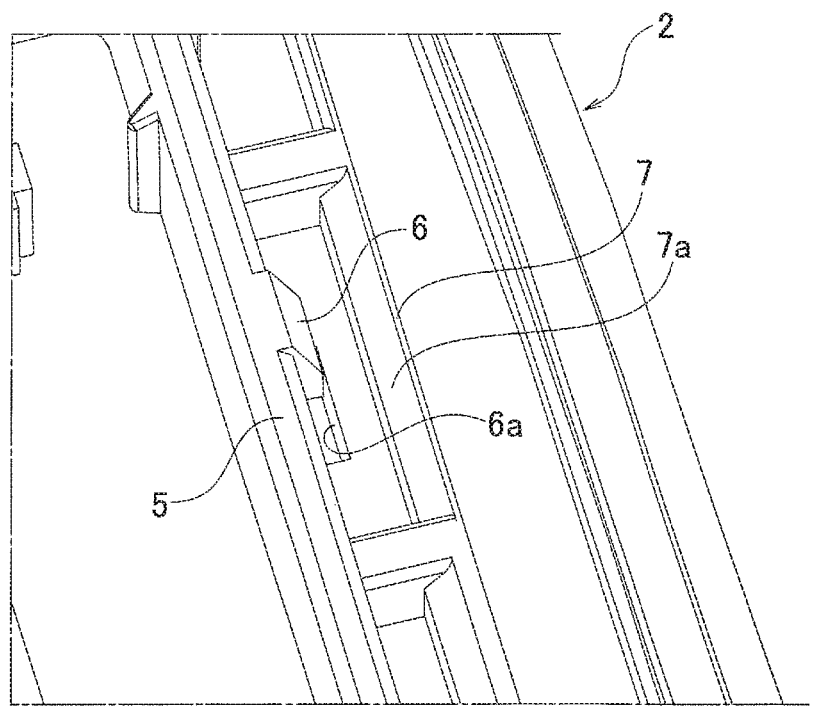
FIG. 8B is an enlarged perspective view of a periphery of a locking claw provided at the housing of the indoor illumination lamp according to the embodiment.

On the upper surface side of the housing 2, a cover attachment wall 5, which is continuous almost over the entire circumference, is provided, except partly break portions. The cover attachment wall 5 is provided with locking claws 6 at six positions. As illustrated in detail in FIGS. 8A and 8B, a die-cutting hole 6a for die-cutting each of the locking claws 6 when molding the housing 2 is formed at the base of each of the locking claws 6. Ribs 7 each surrounding corresponding die-cutting hole 6a are projected on the upper surface side of the housing 2. An inclined plane 7a is formed at a tip part of each of the ribs 7 so that the distance from corresponding locking claw 6 becomes the largest at the tip of the rib 7 and gradually becomes smaller toward the base of each of the ribs 7.

Figure 9:
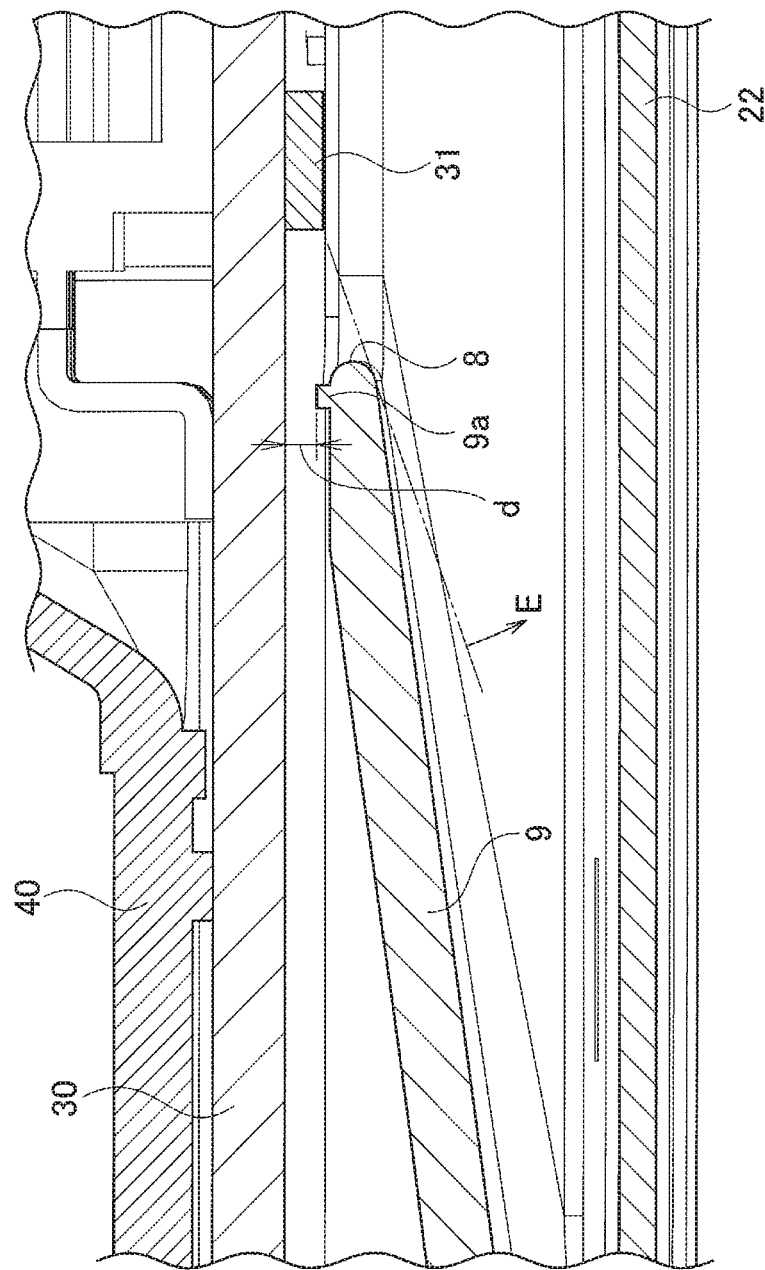
FIG. 9 is a sectional view along line B-B in FIG. 5A.
Figure 10:
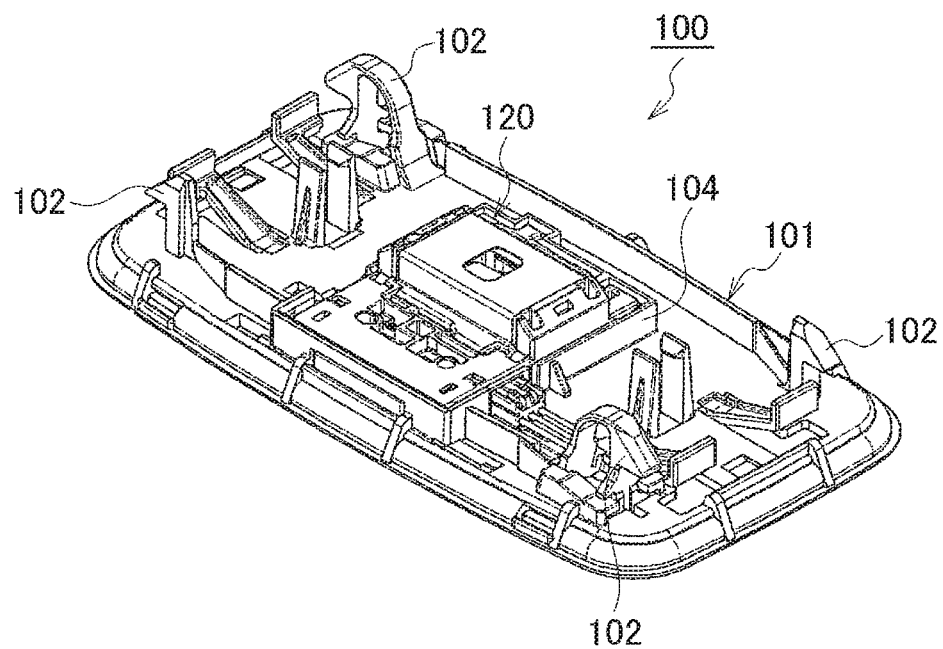
FIG. 10 is a perspective assembly drawing of a conventional indoor illumination lamp seen from above (a side of a ceiling).
Figure 11:
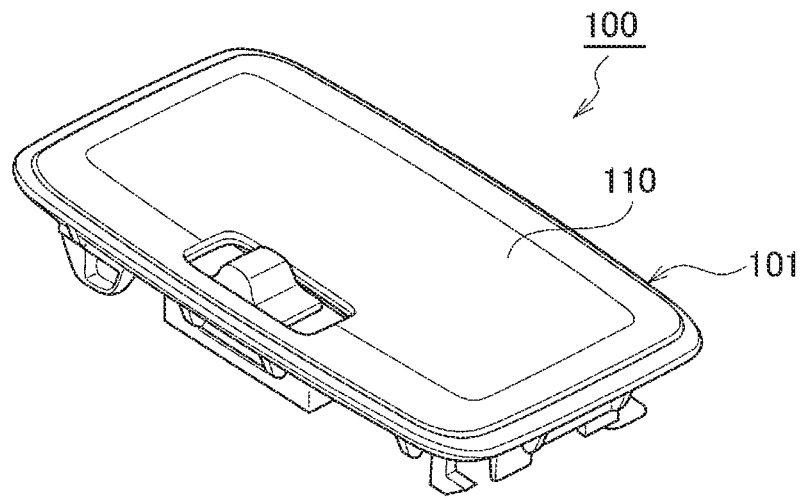
FIG. 11 is a perspective assembly drawing of the conventional indoor illumination lamp seen from below (a side of an interior).
Figure 12:
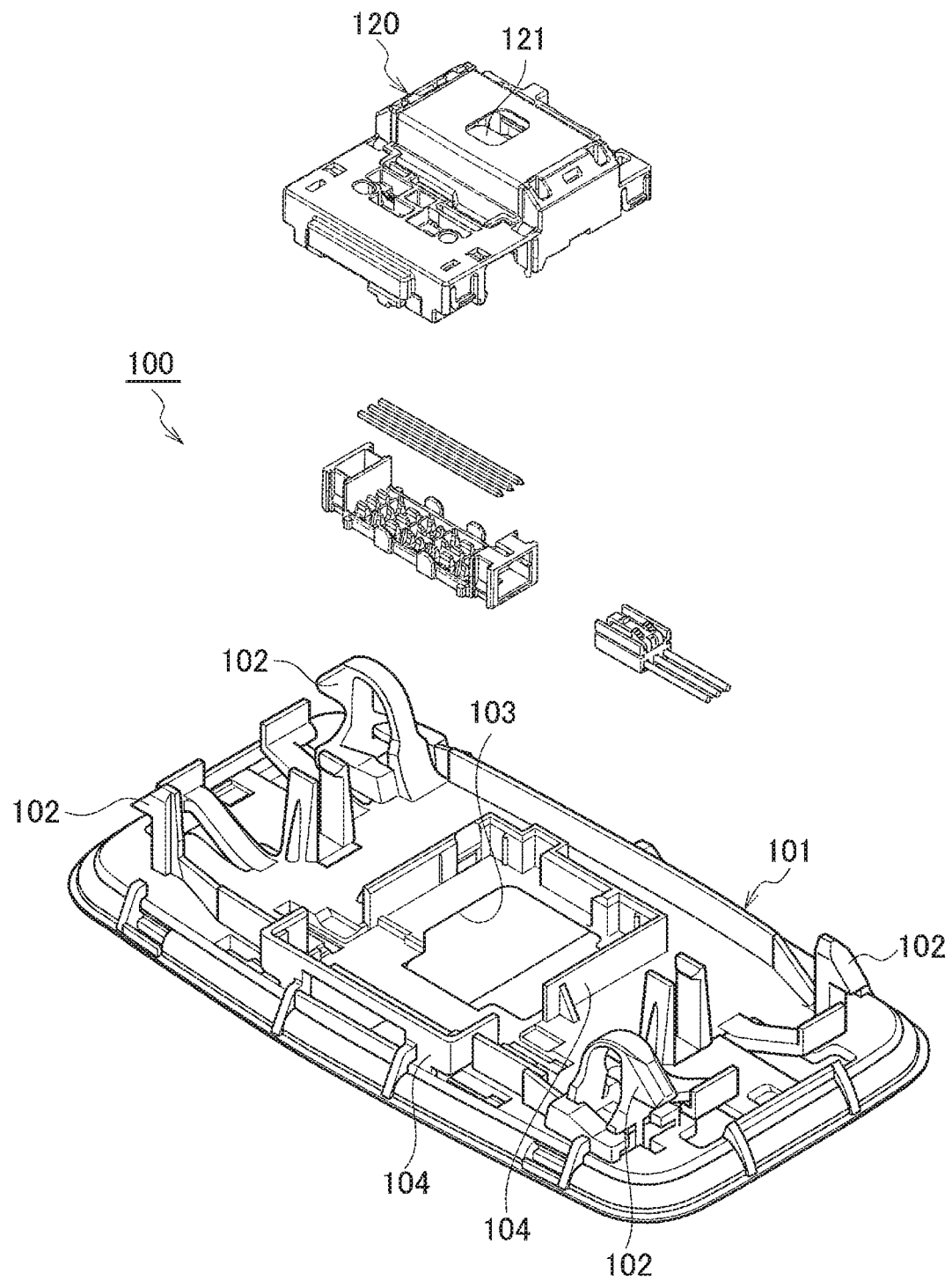
FIG. 12 is an exploded perspective view of the conventional indoor illumination lamp seen from above (the side of the ceiling).

As illustrated in FIGS. 1, 2 and 9, a square-shaped light source opening 8 is formed at substantially the center of the housing 2. An inclined plane part 9 is provided around the light source opening 8. The inclined plane part 9 is inclined upward from four directions toward a position where the light source opening 8 is formed. As illustrated in FIG. 9, a protrusion 9a projected upward is provided over an entire circumference around a position where the light source opening 8 is formed. An upper surface of the protrusion 9a is positioned near the lower surface of the substrate 30.

The switch knob 20 is arranged in the knob attachment wall 3 of the housing 2. The switch knob 20 is of push type.

The inner cover 21 closes the first attachment parts 10, the second attachment parts 16, and die-cutting holes 15 for the electric wire routing ribs 17. This inhibits foreign matter such as dust or dirt, which falls from the ceiling or the like onto an upper surface of the housing 2, from getting into the lens cover 22 through each of the die-cutting holes 15.

The lens cover 22 is formed of a light transparent member. The lens cover 22 transmits and diffuses the light emitted from a light source 31, so that the vehicle interior is irradiated with the light. A knob opening 22a is formed at the lens cover 22. The switch knob 20 is exposed to outside through the knob opening 22a. This allows an operator to operate the switch knob 20 from the vehicle interior.

The substrate 30 includes the light source (e.g., a light emitting diode) 31, and a driver for the light source 31. A switch function unit 32 and a connector 33 are mounted on the substrate 30. The switch function unit 32 is of push type, for example. The switch function unit 32 is arranged in the switch function advancing opening 4 of the housing 2. A counterpart connector 50 is engaged with the connector 33 from the side of the vehicle body (see FIG. 4B). This supplies electric power from the side of the vehicle body to the indoor illumination lamp 1.

The substrate cover 40 is formed of a light nontransparent member. The substrate cover 40 has a locking part 41 at six positions corresponding to the positions of the locking claws 6 of the housing 2. Each of the locking parts 41 has a locking hole 41a. Each of the locking parts 41 is formed to be elastically deformable. A peripheral surface of the substrate cover 40 comes into contact with the cover attachment wall 5 of the housing 2 and the locking parts 41 are locked to the locking claws 6, so that the substrate cover 40 is attached to the housing 2. A connector cover part 40a is projected from the substrate cover 40. The connector 33 of the substrate 30 is arranged inside the connector cover part 40a.

Figure 4A:
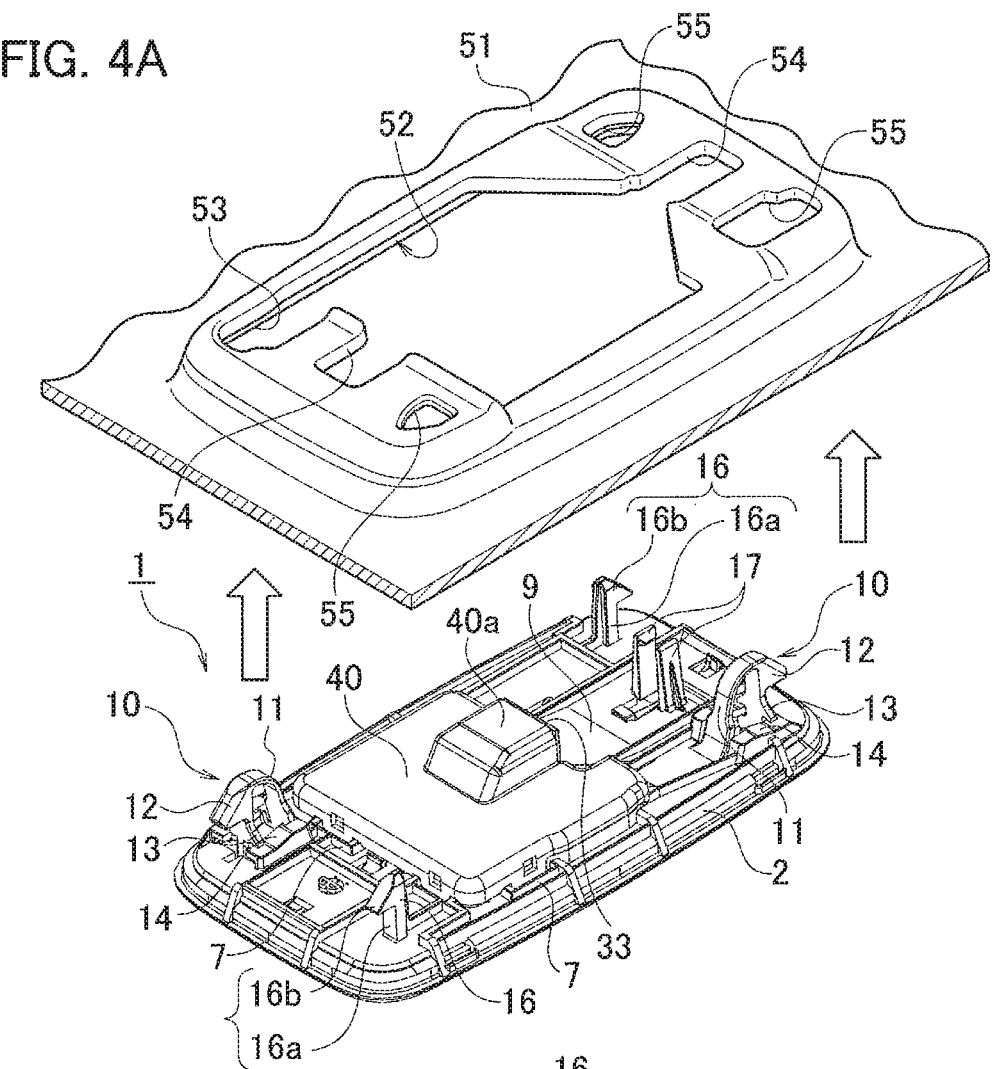
FIG. 4A is a perspective view of a reinforcement, to which the indoor illumination lamp according to the embodiment is mounted, and a perspective assembly drawing of the indoor illumination lamp according to the embodiment seen from above (the side of the ceiling)
Figure 4B:
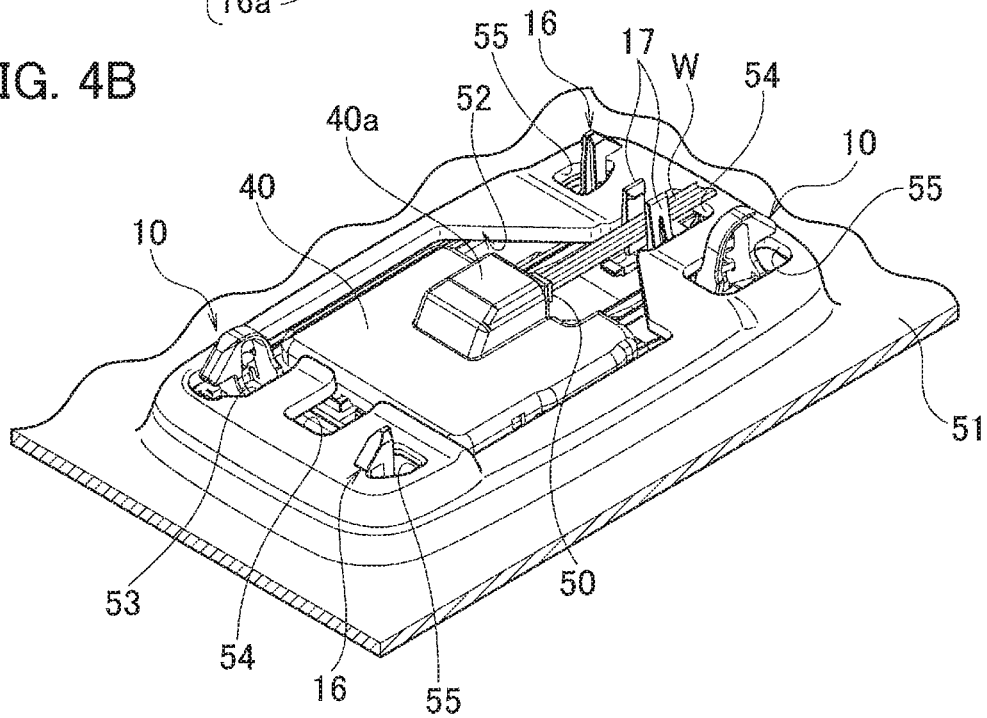
FIG. 4B is a perspective view of the indoor illumination lamp according to the embodiment, which is mounted to the reinforcement, seen from above (the side of the ceiling).
Figure 6A:
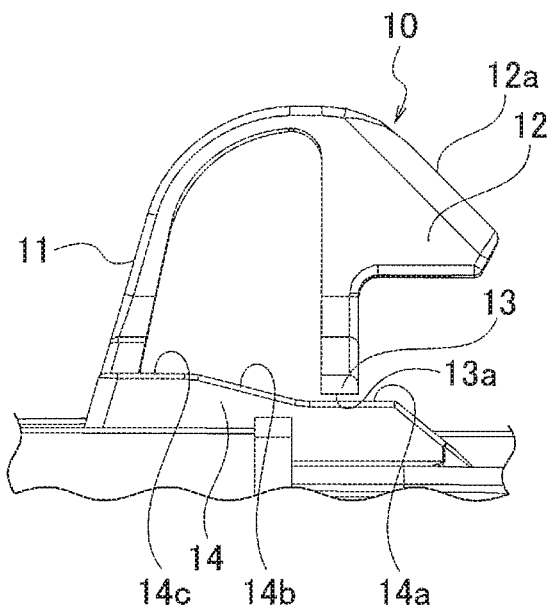
FIG. 6A is a side view of a first attachment part provided at the housing of the indoor illumination lamp according to the embodiment.
Figure 6B:
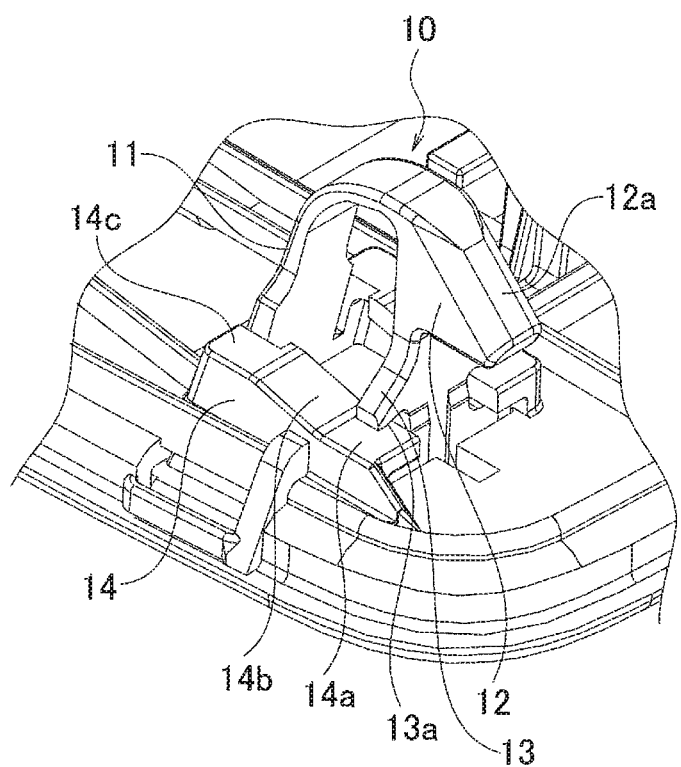
FIG. 6B is a perspective view of the first attachment part provided at the housing of the indoor illumination lamp according to the embodiment.

Next, the structure of the side of the ceiling, on which the indoor illumination lamp 1 is installed, will be described. As illustrated in FIGS. 4A and 4B, at a reinforcement 51 functioning as a vehicle side attachment part of the ceiling is provided with a substrate cover opening 52, a first attachment opening 53 continuous with the substrate cover opening 52, two rib advancing openings 54 continuous with the substrate cover opening 52, and three attachment openings 55 functioning as independent openings, which are not continuous with the substrate cover opening 52.

Next, an assembly procedure of the indoor illumination lamp 1 will be described in brief. The substrate 30 is put in the cover attachment wall 5 on the upper surface side of the housing 2, and the substrate cover 40 is attached from thereabove. Moreover, the switch knob 20 is arranged in the knob attachment wall 3 on the lower surface side of the housing 2 and also two inner covers 21 are attached on the lower surface side of the housing 2, and the lens cover 22 is attached from thereabove. Assembly of the indoor illumination lamp 1 itself is completed in such a manner.

Figure 7A:
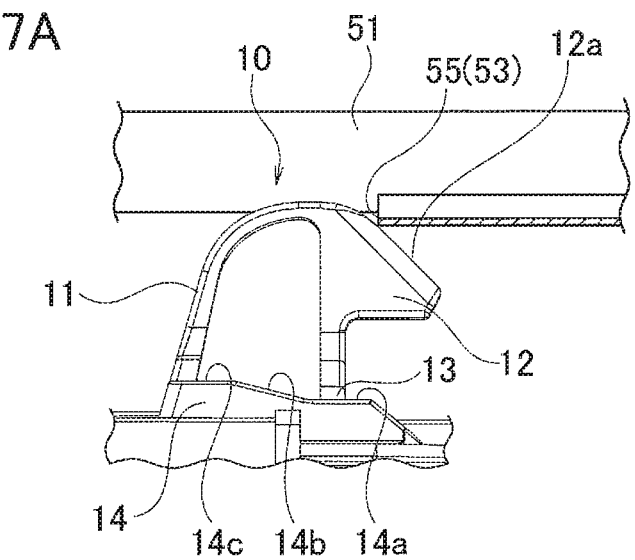
FIGS. 7A to 7C are side views illustrating a process of attaching the first attachment part, which is provided at the housing of the indoor illumination lamp according to the embodiment, to a reinforcement.

Next, an assembly procedure of the indoor illumination lamp 1 to the ceiling will be described in brief. As illustrated in FIG. 4A, the substrate cover 40 is inserted into the substrate cover opening 52 of the reinforcement 51, the pair of electric wire routing ribs 17 are inserted into the rib advancing openings 54, one of the first attachment parts 10 is inserted into the first attachment opening 53, and the other of the first attachment parts 10 and the second attachment parts 16 are inserted respectively into the second attachment openings 55 while performing positioning respectively. Thus, as illustrated in FIG. 7A, the inclined plane 12a of the elastic arm part 11 of each of the first attachment parts 10 comes into contact with an edge of the second attachment opening 55 or the first attachment opening 53. When the elastic arm part 11 of each of the first attachment parts 10 is pressed and inserted into the first attachment opening 53 (the second attachment opening 55) in such a state, reaction force acts on the inclined plane 12a of each of the elastic arm parts 11 from an edge of the first attachment opening 53 (the second attachment opening 55).

Figure 7B:
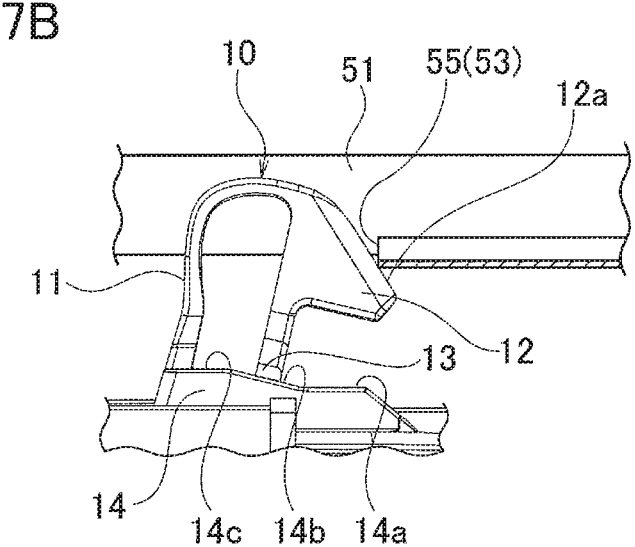

Thus, this reaction force, and also reaction force from the sliding table 14 given when the pair of guide leg parts 13 come into contact with the pair of sliding tables 14 as illustrated in FIG. 7B, cause the elastic arm part 11 not to be flexibly deformed in a forward falling state but to be flexibly deformed gradually in a backward falling state, that is, in a direction getting into the first attachment opening 53 (the second attachment opening 55). During this flexible elastic deformation, the inclined plane 12a of the elastic arm part 11 slides on an edge of the first attachment opening 53 (the second attachment opening 55), and also the lower end surfaces 13a of the pair of guide leg parts 13 slide on the first horizontal sliding surfaces 14a, the inclined sliding surfaces 14b, and the second horizontal sliding surfaces 14c of the pair of sliding tables 14 in this order. Flexible elastic deformation of the elastic arm part 11 causes the tip part 12 of the elastic arm part 11 to gradually get into the first attachment opening 53 (the second attachment opening 55).

Figure 7C:
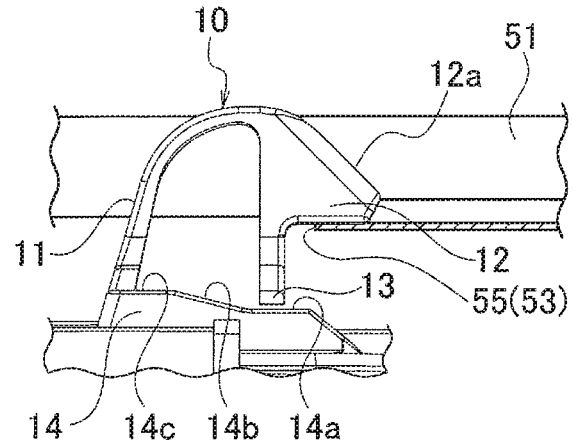

When the tip part 12 of the elastic arm part 11 is completely inserted into the first attachment opening 53 (the second attachment opening 55), the elastic arm part 11 is flexibly deformed to restore as illustrated in FIG. 7C. Flexible restore deformation of the elastic arm part 11 causes the tip part 12 of the elastic arm part 11 to be locked to the periphery of the first attachment opening 53 (the second attachment opening 55).

The second attachment parts 16 are also flexibly deformed to restore after flexible deformation and are locked to the periphery of the corresponding second attachment openings 55.

The counterpart connector 50 on e side of the vehicle body is connected with the connector 33 before the indoor illumination lamp 1 is mounted to the reinforcement 51 or after the indoor illumination lamp 1 is mounted to the reinforcement 51. Assembly of the indoor illumination lamp 1 with the ceiling is completed in such a manner.

As described above, the indoor illumination lamp 1 according to the embodiment includes the housing 2 capable of being attached to the ceiling in the interior of the vehicle and provided with the light source opening 8, the lens cover 22 provided below the housing 2 so as to cover the light source opening 8, the substrate 30 provided on the upper side of the housing 2 and provided with the light source 31 at the position facing the light source opening 8, the substrate cover 40 provided on the upper side of the substrate 30 and the housing 2 so as to cover the substrate 30, and the inclined plane part 9 provided at the housing 2 and inclined upward toward the position where the light source opening 8 is formed.

Figure 13:
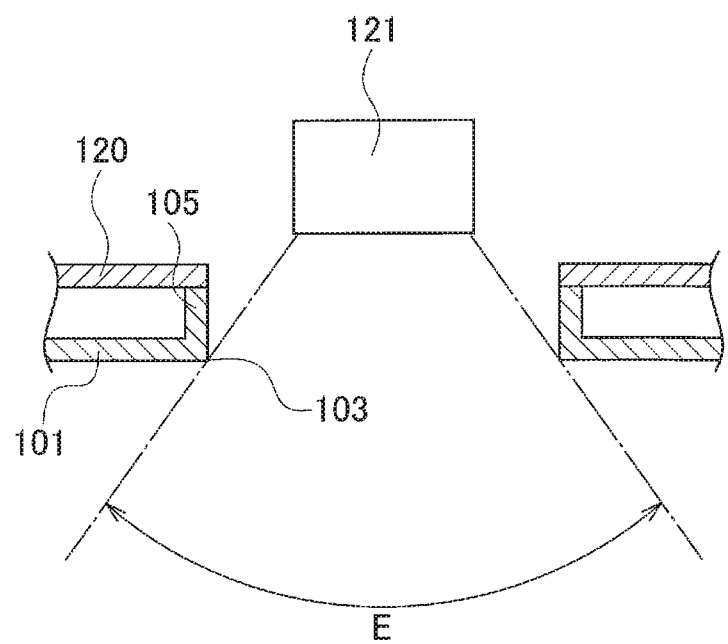
FIG. 13 is a conceptual diagram illustrating an irradiation range of light obtained by a light source opening of the conventional indoor illumination lamp.

Accordingly, a gap d (see FIG. 9) between the substrate 30 and a position of the housing 2 where the light source opening 8 is formed becomes smaller, and therefore foreign matter hardly enters into the lens cover 22 from the light source opening 8. Moreover, the inclined plane part 9 becomes nearest to the light source 31 at the position of the light source opening 8, and becomes lower with the distance from the light source opening 8. As a result, the irradiation range E (see FIG. 9) from the light source opening 8 in the indoor illumination lamp 1 according to the embodiment is expanded in comparison with a case where a rib 105 is provided around a light source opening 8 as in the conventional indoor illumination lamp 100 (see FIG. 13). Consequently, it is possible with the indoor illumination lamp 1 according to the embodiment to expand the irradiation range E from the light source opening 8 and also to prevent entering of foreign matter from the light source opening 8 as much as possible. This makes it possible to prevent a trouble such as occurrence of uneven irradiation due to entering of foreign matter into the inside of the lens cover 22 as much as possible in the indoor illumination lamp 1 according to the embodiment.

In the indoor illumination lamp 1 according to the embodiment, the protrusion 9a projected upward is provided around the light source opening 8 of the inclined plane part 9. Accordingly, the gap d between the substrate 30 and a position of the housing 2 where the light source opening 8 is formed becomes further smaller. As a result, it is possible with the indoor illumination lamp 1 according to the embodiment to further prevent entering of foreign matter from the light source opening 8.

The indoor illumination lamp 1 according to the embodiment includes the locking claws 6 provided at the housing 2, the locking parts 41 provided at the substrate cover 40 and capable of locking the locking claws 6; and the ribs 7 projected on the upper surface side of the housing 2 and surrounding the die-cutting holes 6a formed at bases of the locking claws 6. Accordingly, foreign matter hardly enters into the lens cover 22 through the die-cutting holes 6a in the indoor illumination lamp 1 according to the embodiment.

In the indoor illumination lamp 1 according to the embodiment, each of the inclined planes 7a is formed at an upper end part of corresponding rib 7 so that the distance from each of the locking claws 6 becomes the largest at the tip of the corresponding rib 7 and gradually becomes smaller toward the base of the corresponding rib 7. Accordingly, in the process of attaching the substrate cover 40 to the housing 2, the inclined plane 7a of each of the ribs 7 functions as an insertion guide for the locking parts 41. As a result, the attaching property of the substrate cover 40 to the housing 2 is improved in the indoor illumination lamp 1 according to the embodiment.

In the indoor illumination lamp 1 according to the embodiment, each surface, which slides in the process of attaching the first attachment part 10 to the first attachment opening 53 (the second attachment opening 55) of the reinforcement 51, is formed as a friction reduced surface, and therefore preferable attaching workability of the indoor illumination lamp 1 to the reinforcement 51 can be obtained.

Regarding the gap d between the substrate 30 and the protrusion 9*a* of the housing 2 in the indoor illumination lamp 1 according to the embodiment, the inclination angle of the inclined plane part 9 may be adjusted and set to a height with which the protrusion 9*a* comes into contact with the substrate 30 (that is, gap d=zero). It is possible with such a structure to further reliably prevent foreign matter such as dust or dirt, which falls from the ceiling or the like onto an upper surface of the housing 2, from getting into the inside of the lens cover 22 through the light source opening 8.

What is claimed is:

1. An indoor illumination lamp, comprising:

a housing capable of being attached to a ceiling in an interior of a vehicle and provided with a light source opening;

a lens cover provided below the housing so as to cover the light source opening;

a substrate provided on an upper side of the housing and provided with a light source at a position facing the light source opening;

a substrate cover provided on an upper side of the substrate and the housing so as to cover the substrate;

an inclined plane part provided at the housing and inclined upward toward a position where the light source opening is formed;

a locking claw provided at the housing;

a locking part provided at the substrate cover and capable of locking the locking claw; and a rib projected on an upper surface side of the housing and surrounds a die-cutting hole formed at a base of the locking claw, wherein an inclined place is provided at an upper end part of the rib so that a distance from the locking claw becomes the largest at a tip of the rib and gradually becomes smaller toward the base of the rib.

2. The indoor illumination lamp of claim 1, wherein a protrusion projected upward is provided around the light source opening of the inclined plane part.

\* \* \* \* \*